United States Patent
Katayama et al.

(10) Patent No.: US 9,948,418 B2
(45) Date of Patent: Apr. 17, 2018

(54) SYNCHRONOUS MEASUREMENT SYSTEM

(71) Applicant: SEIKO EPSON CORPORATION, Tokyo (JP)

(72) Inventors: Takao Katayama, Matsumoto (JP); Kazuyoshi Takeda, Chino (JP)

(73) Assignee: Seiko Epson Corporation (JP)

( * ) Notice: Subject to any disclaimer, the term of this patent is extended or adjusted under 35 U.S.C. 154(b) by 247 days.

(21) Appl. No.: 14/773,912

(22) PCT Filed: Mar. 7, 2014

(86) PCT No.: PCT/JP2014/001272
§ 371 (c)(1),
(2) Date: Sep. 9, 2015

(87) PCT Pub. No.: WO2014/141651
PCT Pub. Date: Sep. 18, 2014

(65) Prior Publication Data
US 2016/0036544 A1    Feb. 4, 2016

(30) Foreign Application Priority Data

Mar. 15, 2013    (JP) ................. 2013-053257

(51) Int. Cl.
| | | |
|---|---|---|
| G01R 21/00 | (2006.01) | |
| H04J 3/06 | (2006.01) | |
| G01D 18/00 | (2006.01) | |
| H04L 29/08 | (2006.01) | |
| G06F 11/30 | (2006.01) | |

(52) U.S. Cl.
CPC ............ *H04J 3/0658* (2013.01); *G01D 18/00* (2013.01); *H04L 67/12* (2013.01)

(58) Field of Classification Search
CPC .................................................... H04J 3/0658
See application file for complete search history.

(56) References Cited

U.S. PATENT DOCUMENTS

| 8,378,780 B2 | 2/2013 | Hanada et al. |
| 2011/0018688 A1 | 1/2011 | Hanada et al. |
| 2011/0298597 A1 | 12/2011 | Kaihori et al. |

FOREIGN PATENT DOCUMENTS

| JP | H03-104496 | * | 5/1991 |
| JP | H03-104496 A | | 5/1991 |
| JP | H09-130871 | * | 5/1997 |
| JP | H09-130871 A | | 5/1997 |

(Continued)

*Primary Examiner* — Phuong Huynh
(74) *Attorney, Agent, or Firm* — Harness, Dickey & Pierce, P.L.C.

(57) ABSTRACT

A synchronous measurement system includes a controller and a sensor unit connected to the controller. The controller transmits a plurality of synchronization commands to the sensor unit at every predetermined interval. The sensor unit transmits measurement data to the controller in synchronization with each one of the plurality of synchronization commands. The controller includes a data processing section configured to process the measurement data transmitted from the sensor unit and a counter configured to count the synchronization command. The controller builds a data structure in which a count value of the synchronization command corresponding to the measurement data is added to the measurement data.

11 Claims, 12 Drawing Sheets

(56) References Cited

FOREIGN PATENT DOCUMENTS

| | | | |
|---|---|---|---|
| JP | 2001-306496 | * | 11/2001 |
| JP | 2001-306496 A | | 11/2001 |
| JP | 2004-080132 A | | 3/2004 |
| JP | 2006-098128 | * | 4/2006 |
| JP | 2006-098128 A | | 4/2006 |
| JP | 2009-271731 | * | 11/2009 |
| JP | 2009-271731 A | | 11/2009 |
| JP | 2011-028525 | * | 2/2011 |
| JP | 2011-028525 A | | 2/2011 |
| JP | 2011-253341 A | | 12/2011 |
| JP | 4926752 B2 | | 5/2012 |

* cited by examiner

[Fig. 1]
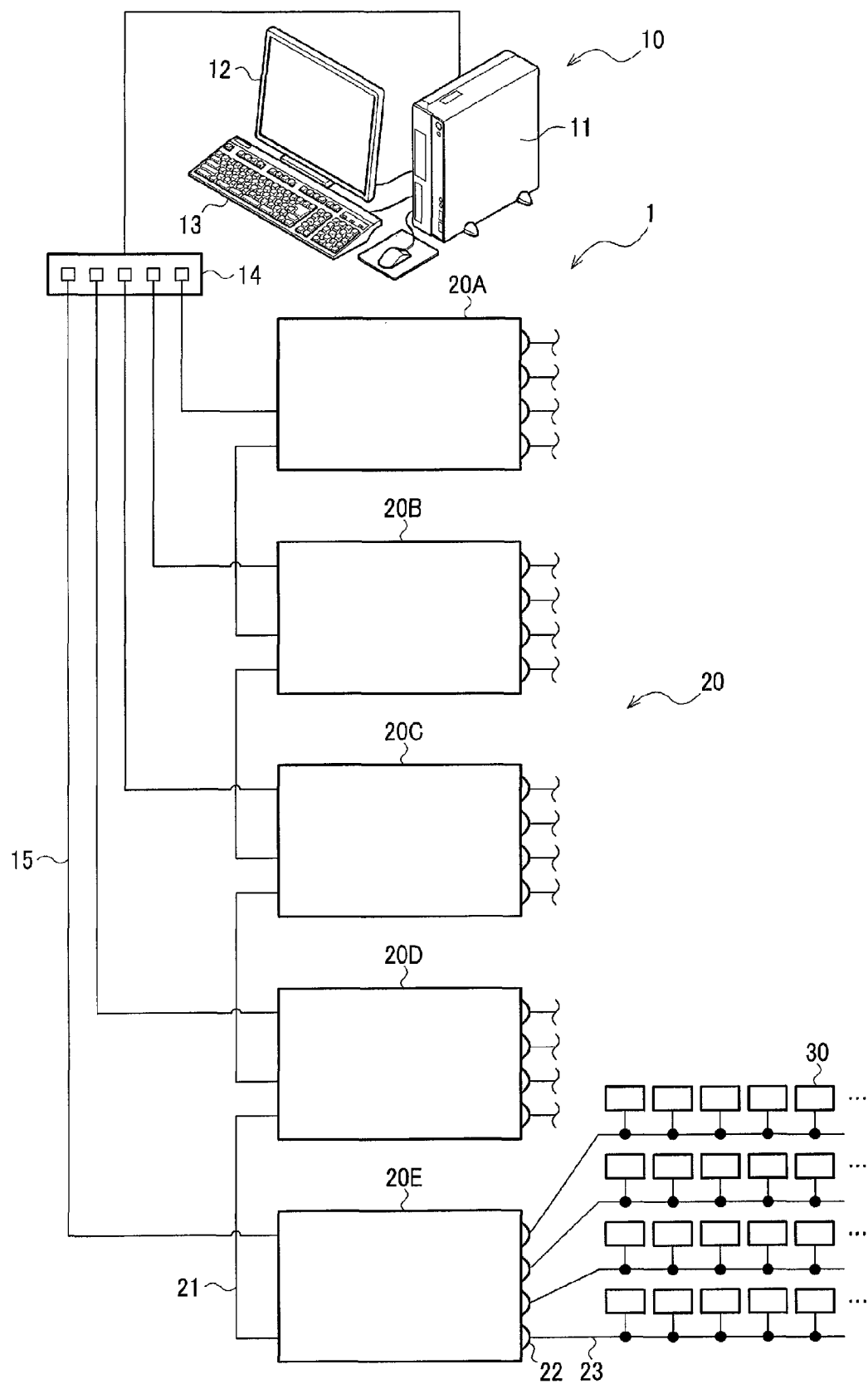

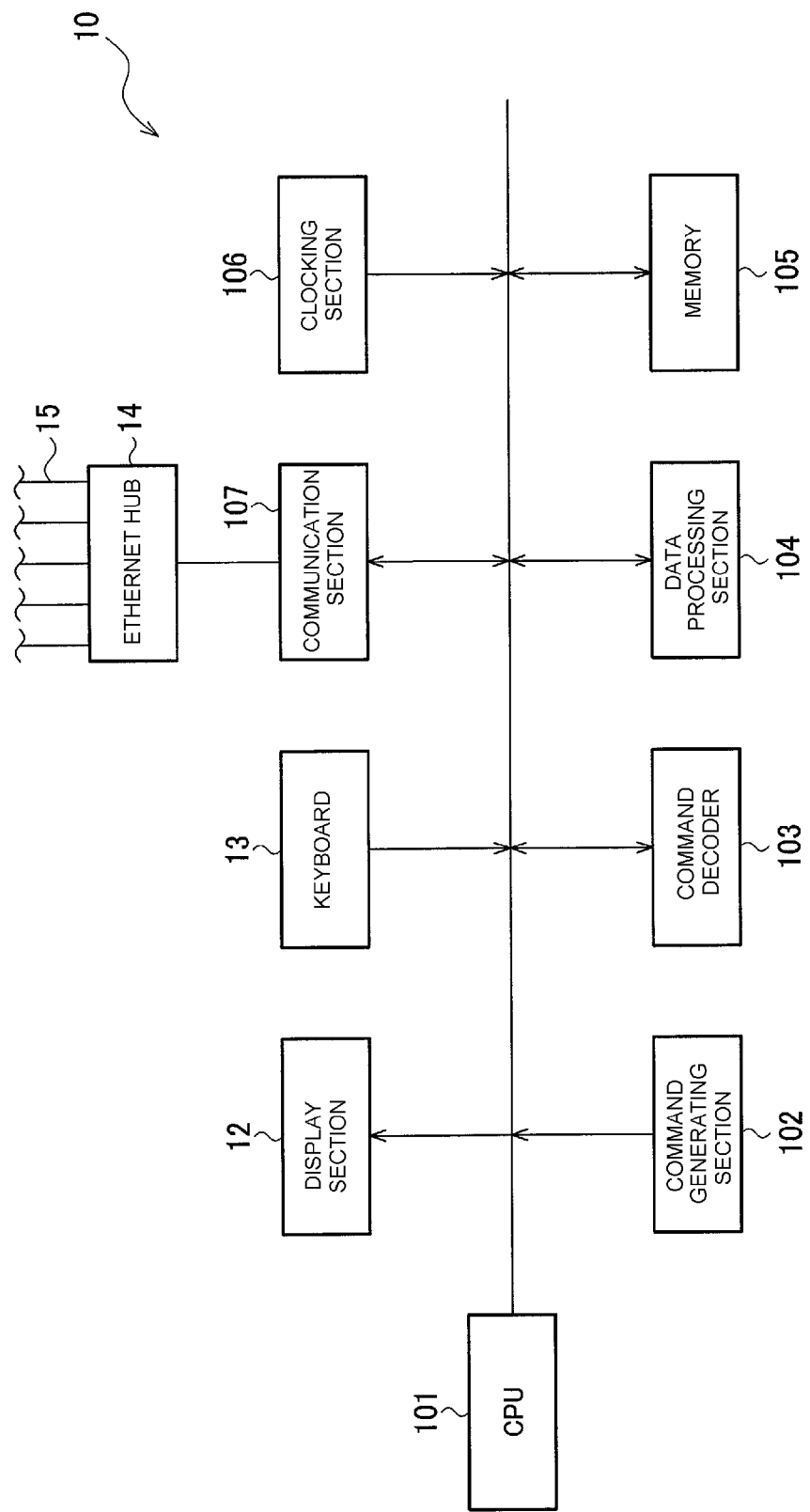

[Fig. 3]
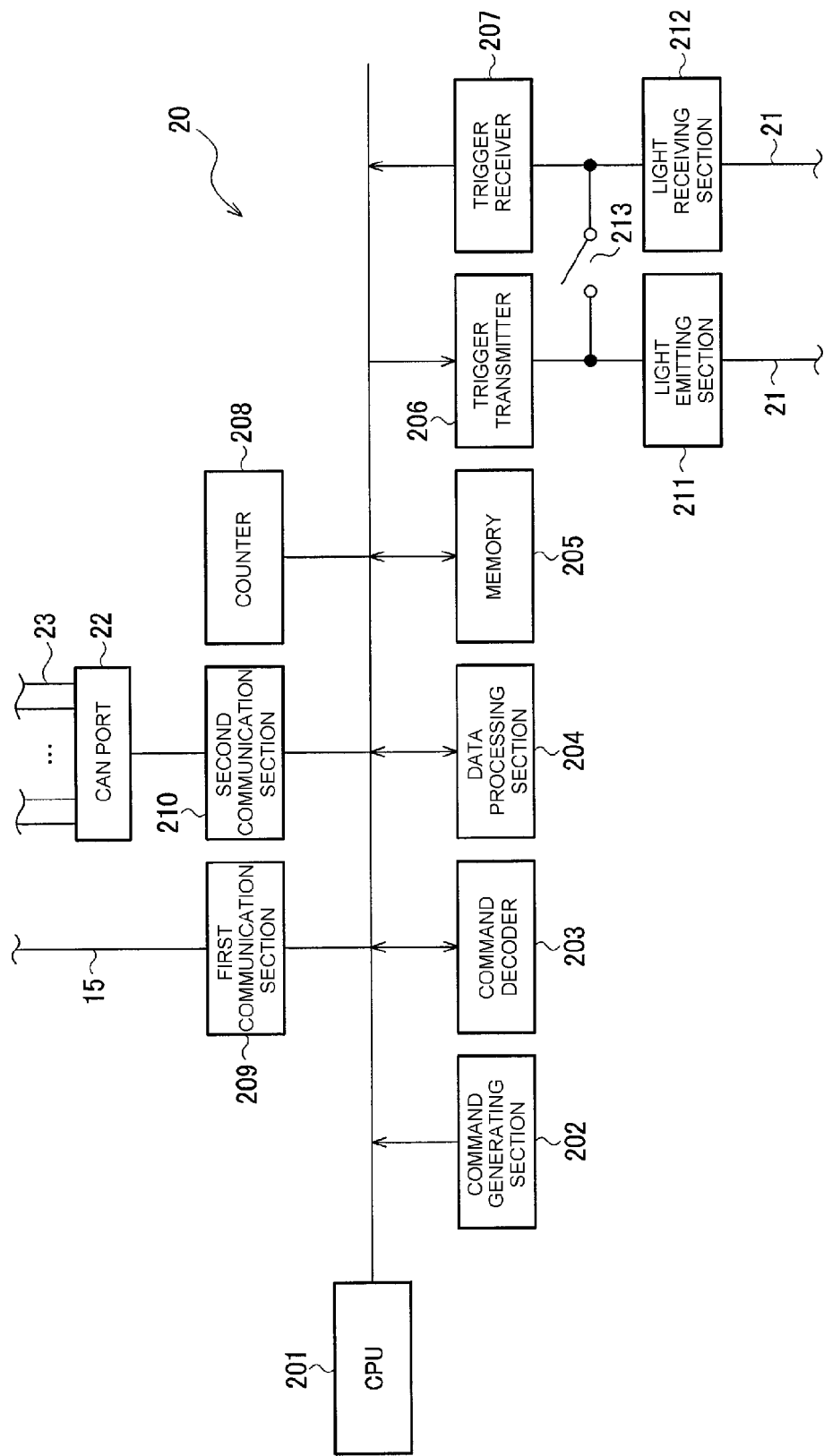

[Fig. 4]
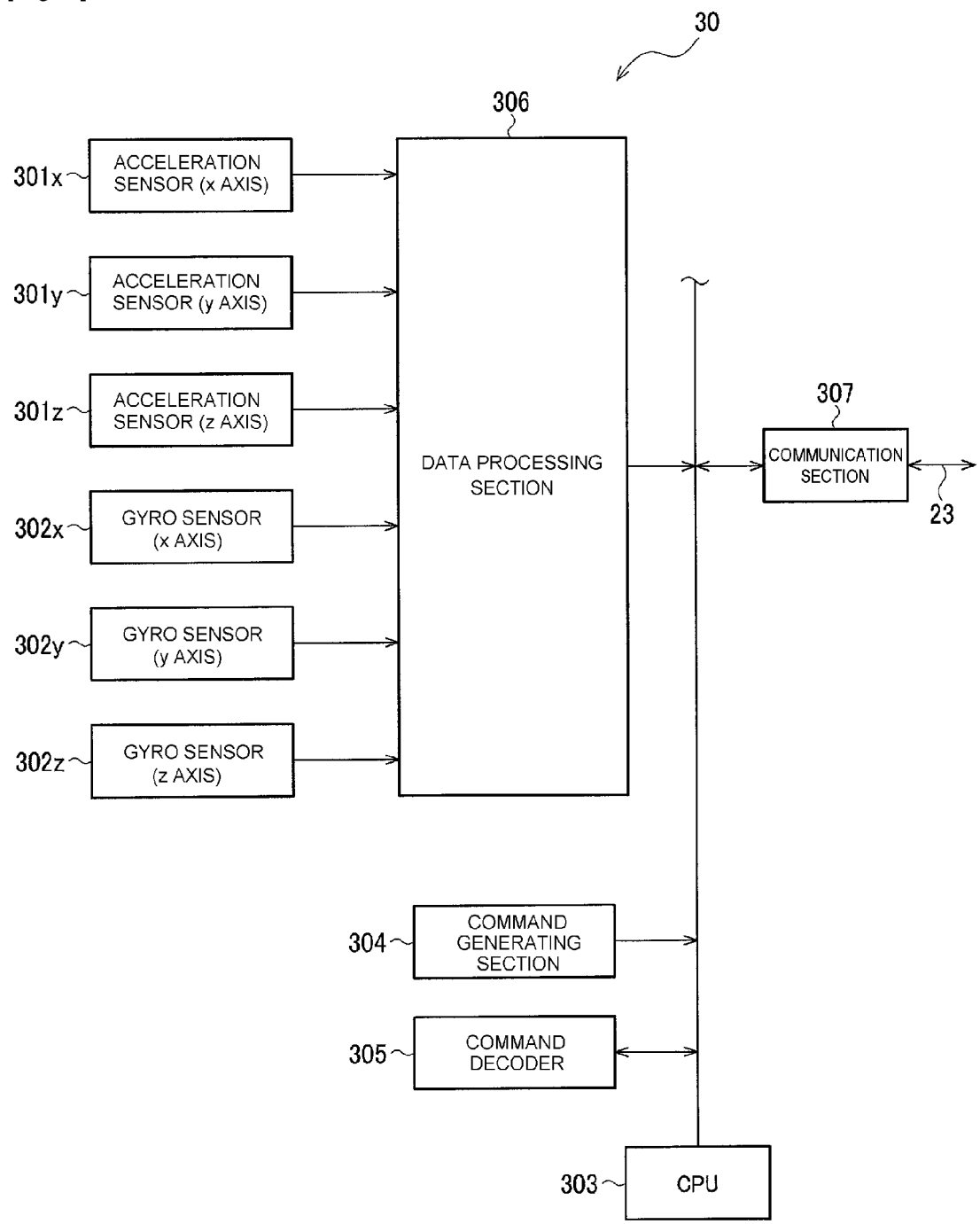

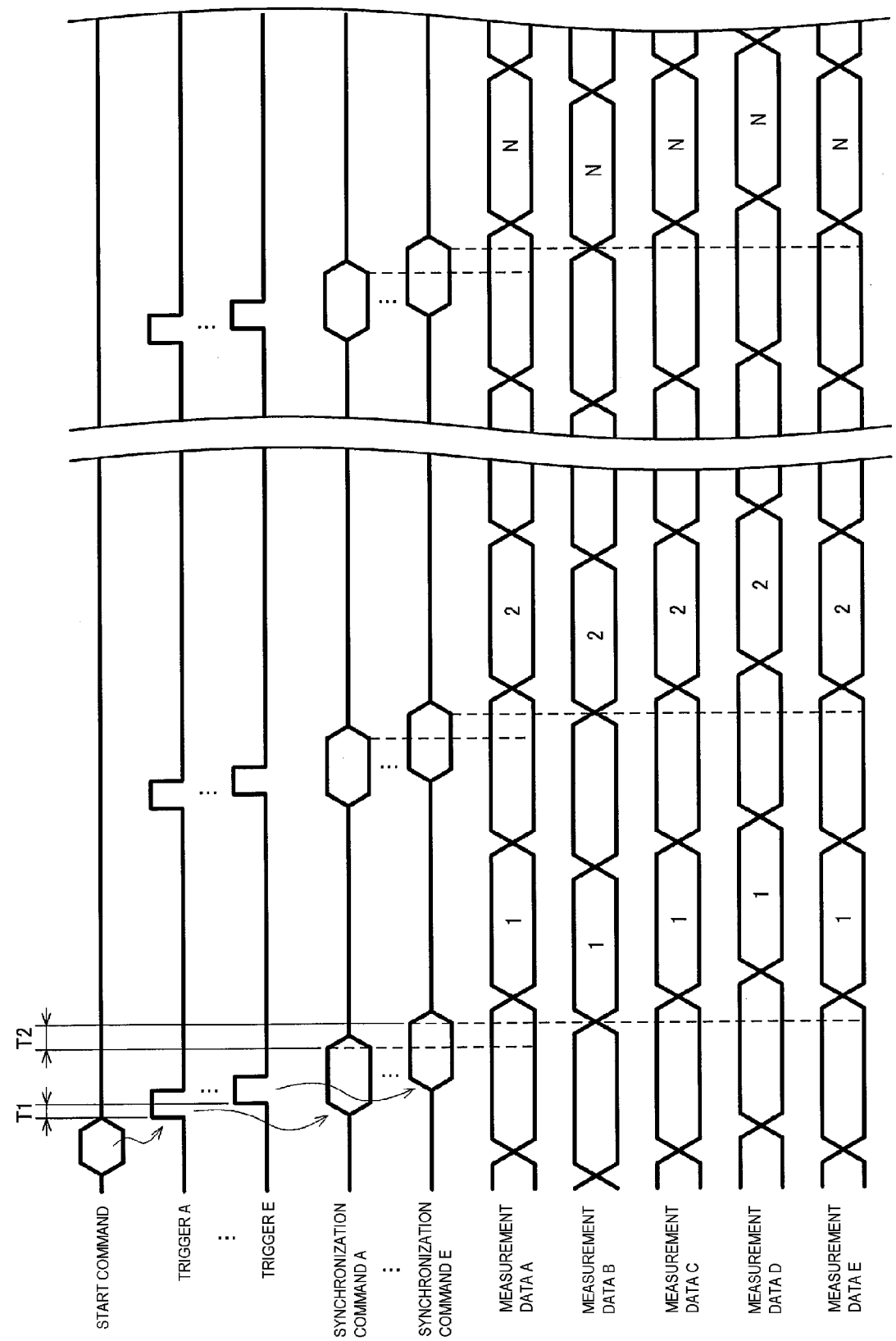
[Fig. 5]

[Fig. 6A]
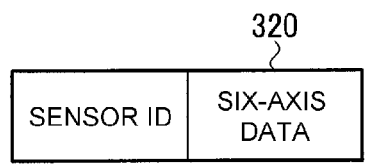
[Fig. 6B]
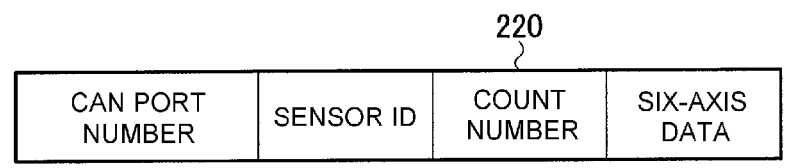
[Fig. 6C]
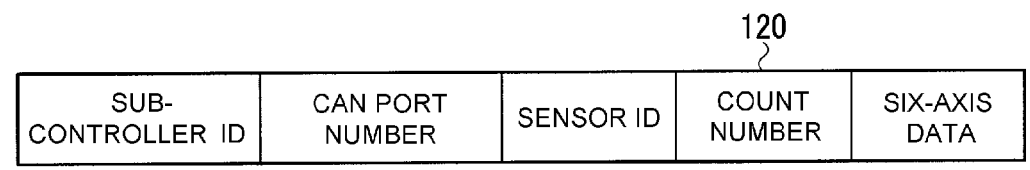

[Fig. 7]

| SAMPLING COUNTER | ANGLE X AXIS (dps) | ANGLE Y AXIS (dps) | ANGLE Z AXIS (dps) | ACCELERATION X AXIS (mG) | ACCELERATION Y AXIS (mG) | ACCELERATION Z AXIS (mG) |
|---|---|---|---|---|---|---|
| 1 | 0.025 | -0.0875 | -0.1125 | -30.125 | 100.75 | 997.375 |
| 2 | 0.1125 | -0.0125 | -0.125 | -28.5 | 100.25 | 999.5 |
| 3 | 0.1 | -0.125 | -0.375 | -28.625 | 101.125 | 997.75 |
| 4 | 0.125 | 0 | -0.125 | -28.5 | 100.375 | 997.75 |
| 5 | 0.0625 | 0.1 | 0.075 | -30.875 | 101.25 | 993.875 |
| 6 | 0.125 | 0.075 | -0.0125 | -30.375 | 101.75 | 993.875 |
| 7 | 0.1875 | 0.075 | -0.15 | -27.875 | 101.625 | 995.625 |
| 8 | 0.1875 | 0 | -0.0625 | -27.75 | 103 | 998.125 |
| 9 | 0.05 | -0.05 | -0.0125 | -26.5 | 102.125 | 1000.875 |
| 11 | 0.15 | -0.0875 | -0.0125 | -30.75 | 102.25 | 995.625 |
| 12 | 0.0625 | -0.1125 | 0.025 | -31.25 | 104 | 995.875 |
| 13 | 0.075 | -0.05 | -0.0125 | -27.845 | 100.625 | 996.125 |
| 14 | 0.0625 | -0.025 | -0.0875 | -25.375 | 99.375 | 997.75 |
| 15 | -0.0625 | -0.0875 | -0.1 | -29.5 | 100.125 | 997.75 |
| 16 | 0.05 | -0.05 | -0.1 | -30.875 | 101.625 | 994.75 |
| 17 | 0.0875 | 0.05 | 0.0625 | -31.625 | 103.5 | 991 |
| 18 | 0.0125 | 0 | -0.0625 | -29.25 | 102.875 | 993.75 |
| 19 | 0.175 | -0.025 | 0.1 | -27.25 | 103.5 | 996.75 |
| 20 | 0.1125 | 0.0125 | -0.05 | -32 | 105.25 | 996.75 |
| 21 | 0.05 | -0.05 | -0.1625 | -29.875 | 101.125 | 999.25 |
| 22 | 0.05 | 0.0375 | -0.125 | -30.75 | 102.125 | 999.125 |
| 23 | 0 | -0.025 | -0.0625 | -34.25 | 101.375 | 998.125 |
| 24 | 0.025 | -0.1625 | -0.0875 | -34.25 | 103.625 | 994 |
| 25 | 0.0125 | -0.0375 | 0.0375 | -26.875 | 106.5 | 993 |
| ... | ... | ... | ... | ... | ... | ... |

[Fig. 8]

| SAMPLING COUNTER | ANGLE X AXIS (dps) | ANGLE Y AXIS (dps) | ANGLE Z AXIS (dps) | ACCELERATION X AXIS (mG) | ACCELERATION Y AXIS (mG) | ACCELERATION Z AXIS (mG) |
|---|---|---|---|---|---|---|
| 1 | 0.025 | -0.0875 | -0.1125 | -30.125 | 100.75 | 997.375 |
| 2 | 0.1125 | -0.0125 | -0.125 | -28.5 | 100.25 | 999.5 |
| 3 | 0.1 | -0.125 | -0.375 | -28.625 | 101.125 | 997.75 |
| 4 | 0.125 | 0 | -0.125 | -28.5 | 100.375 | 997.75 |
| 5 | 0.0625 | 0.1 | 0.075 | -30.875 | 101.25 | 993.875 |
| 6 | 0.125 | 0.075 | -0.0125 | -30.375 | 101.75 | 993.875 |
| 7 | 0.1875 | 0.075 | -0.15 | -27.875 | 101.625 | 995.625 |
| 8 | 0.1875 | 0 | -0.0625 | -27.75 | 103 | 998.125 |
| 9 | 0.05 | -0.05 | -0.0125 | -26.5 | 102.125 | 1000.875 |
| 10 | 999.9999 | 999.9999 | 999.9999 | 999.9999 | 999.9999 | 999.9999 |
| 11 | 0.15 | -0.0875 | -0.0125 | -30.75 | 102.25 | 995.625 |
| 12 | 0.0625 | -0.1125 | 0.025 | -31.25 | 104 | 995.875 |
| 13 | 0.075 | -0.05 | -0.0125 | -27.845 | 100.625 | 996.125 |
| 14 | 0.0625 | -0.025 | -0.0875 | -25.375 | 99.375 | 997.75 |
| 15 | -0.0625 | -0.0875 | -0.1 | -29.5 | 100.125 | 997.75 |
| 16 | 0.05 | -0.05 | -0.1 | -30.875 | 101.625 | 994.75 |
| 17 | 0.0875 | 0.05 | 0.0625 | -31.625 | 103.5 | 991 |
| 18 | 0.0125 | -0.025 | -0.0625 | -29.25 | 102.875 | 993.75 |
| 19 | 0.175 | 0.0125 | 0.1 | -27.25 | 103.5 | 996.75 |
| 20 | 0.1125 | -0.05 | -0.05 | -32 | 105.25 | 996.75 |
| 21 | 0.05 | 0.0375 | -0.1625 | -29.875 | 101.125 | 999.25 |
| 22 | 0.05 | -0.025 | -0.125 | -30.75 | 102.125 | 999.125 |
| 23 | 0 | -0.1625 | -0.0625 | -34.25 | 101.375 | 998.125 |
| 24 | 0.025 | -0.0375 | -0.0875 | -34.25 | 103.625 | 994 |
| 25 | 0.0125 | | 0.0375 | -26.875 | 106.5 | 993 |
| ... | ... | ... | ... | ... | ... | ... |

[Fig. 9]

| SAMPLING COUNTER | ANGLE X AXIS (dps) | ANGLE Y AXIS (dps) | ANGLE Z AXIS (dps) | ACCELERATION X AXIS (mG) | ACCELERATION Y AXIS (mG) | ACCELERATION Z AXIS (mG) |
|---|---|---|---|---|---|---|
| 1 | 0.025 | -0.0875 | -0.1125 | -30.125 | 100.75 | 997.375 |
| 2 | 0.1125 | -0.0125 | -0.125 | -28.5 | 100.25 | 999.5 |
| 3 | 0.1 | -0.125 | -0.375 | -28.625 | 101.125 | 997.75 |
| 4 | 0.125 | 0 | -0.125 | -28.5 | 100.375 | 997.75 |
| 5 | 0.0625 | 0.1 | 0.075 | -30.875 | 101.25 | 993.875 |
| 6 | 0.125 | 0.075 | -0.0125 | -30.375 | 101.75 | 993.875 |
| 7 | 0.1875 | 0.075 | -0.15 | -27.875 | 101.625 | 995.625 |
| 8 | 0.1875 | 0 | -0.0625 | -27.75 | 103 | 998.125 |
| 9 | 0.05 | -0.05 | -0.0125 | -26.5 | 102.125 | 1000.875 |
| 10 | 0.1 | -0.06875 | -0.0125 | -28.625 | 102.1875 | 998.25 |
| 11 | 0.15 | -0.0875 | -0.0125 | -30.75 | 102.25 | 995.625 |
| 12 | 0.0625 | -0.1125 | 0.025 | -31.25 | 104 | 995.875 |
| 13 | 0.075 | -0.05 | -0.0125 | -27.845 | 100.625 | 996.125 |
| 14 | 0.0625 | -0.025 | -0.0875 | -25.375 | 99.375 | 997.75 |
| 15 | -0.0625 | -0.0875 | -0.1 | -29.5 | 100.125 | 997.75 |
| 16 | 0.05 | -0.05 | -0.1 | -30.875 | 101.625 | 994.75 |
| 17 | 0.0875 | 0.05 | 0.0625 | -31.625 | 103.5 | 991 |
| 18 | 0.0125 | 0 | -0.0625 | -29.25 | 102.875 | 993.75 |
| 19 | 0.175 | -0.025 | 0.1 | -27.25 | 103.5 | 996.75 |
| 20 | 0.1125 | 0.0125 | -0.05 | -32 | 105.25 | 996.75 |
| 21 | 0.05 | -0.05 | -0.1625 | -29.875 | 101.125 | 999.25 |
| 22 | 0.05 | 0.0375 | -0.125 | -30.75 | 102.125 | 999.125 |
| 23 | 0 | -0.025 | -0.0625 | -34.25 | 101.375 | 998.125 |
| 24 | 0.025 | -0.1625 | -0.0875 | -34.25 | 103.625 | 994 |
| 25 | 0.0125 | -0.0375 | 0.0375 | -26.875 | 106.5 | 993 |
| ... | | | | | | |

[Fig. 10]

| SAMPLING COUNTER | ANGLE X AXIS (dps) | ANGLE Y AXIS (dps) | ANGLE Z AXIS (dps) | ACCELERATION X AXIS (mG) | ACCELERATION Y AXIS (mG) | ACCELERATION Z AXIS (mG) |
|---|---|---|---|---|---|---|
| 1 | 0.025 | -0.0875 | -0.1125 | -30.125 | 100.75 | 997.375 |
| 2 | 0.1125 | -0.0125 | -0.125 | -28.5 | 100.25 | 999.5 |
| 3 | 0.1 | -0.125 | -0.375 | -28.625 | 101.125 | 997.75 |
| 4 | 0.125 | 0 | -0.125 | -28.5 | 100.375 | 997.75 |
| 5 | 0.0625 | 0.1 | 0.075 | -30.875 | 101.25 | 993.875 |
| 6 | 0.125 | 0.075 | -0.0125 | -30.375 | 101.75 | 993.875 |
| 7 | 0.1875 | 0.075 | -0.15 | -27.875 | 101.625 | 995.625 |
| 8 | 0.1875 | 0 | -0.0625 | -27.75 | 103 | 998.125 |
| 9 | 0.05 | -0.05 | -0.0125 | -26.5 | 102.125 | 1000.875 |
| 10 | 0.1875 | -0.0875 | -0.0125 | -27.625 | 101.5 | 998.75 |
| 10 | 0.1875 | -0.0875 | -0.0125 | -27.625 | 101.5 | 998.75 |
| 11 | 0.15 | -0.0875 | -0.0125 | -30.75 | 102.25 | 995.625 |
| 12 | 0.0625 | -0.1125 | 0.025 | -31.25 | 104 | 995.875 |
| 13 | 0.075 | -0.05 | -0.0125 | -27.845 | 100.625 | 996.125 |
| 14 | 0.0625 | -0.025 | -0.0875 | -25.375 | 99.375 | 997.75 |
| 15 | -0.0625 | -0.0875 | -0.1 | -29.5 | 100.125 | 997.75 |
| 16 | 0.05 | -0.05 | -0.1 | -30.875 | 101.625 | 994.75 |
| 17 | 0.0875 | 0.05 | 0.0625 | -31.625 | 103.5 | 991 |
| 18 | 0.0125 | 0 | -0.0625 | -29.25 | 102.875 | 993.75 |
| 19 | 0.175 | -0.025 | 0.1 | -27.25 | 103.5 | 996.75 |
| 20 | 0.1125 | 0.0125 | -0.05 | -32 | 105.25 | 996.75 |
| 21 | 0.05 | -0.05 | -0.1625 | -29.875 | 101.125 | 999.25 |
| 22 | 0.05 | 0.0375 | -0.125 | -30.75 | 102.125 | 999.125 |
| 23 | 0 | -0.025 | -0.0625 | -34.25 | 101.375 | 998.125 |
| 24 | 0.025 | -0.1625 | -0.0875 | -34.25 | 103.625 | 994 |
| 25 | 0.0125 | -0.0375 | 0.0375 | -26.875 | 106.5 | 993 |
| ... | | | | | | |

[Fig. 11]

| SAMPLING COUNTER | ANGLE X AXIS (dps) | ANGLE Y AXIS (dps) | ANGLE Z AXIS (dps) | ACCELERATION X AXIS (mG) | ACCELERATION Y AXIS (mG) | ACCELERATION Z AXIS (mG) |
|---|---|---|---|---|---|---|
| 1 | 0.025 | -0.0875 | -0.1125 | -30.125 | 100.75 | 997.375 |
| 2 | 0.1125 | -0.0125 | -0.125 | -28.5 | 100.25 | 999.5 |
| 3 | 0.1 | -0.125 | -0.375 | -28.625 | 101.125 | 997.75 |
| 4 | 0.125 | 0 | -0.125 | -28.5 | 100.375 | 997.75 |
| 5 | 0.0625 | 0.1 | 0.075 | -30.875 | 101.25 | 993.875 |
| 6 | 0.125 | 0.075 | -0.0125 | -30.375 | 101.75 | 993.875 |
| 7 | 0.1875 | 0.075 | -0.15 | -27.875 | 101.625 | 995.625 |
| 8 | 0.1875 | 0 | -0.0625 | -27.75 | 103 | 998.125 |
| 9 | 0.05 | -0.05 | -0.0125 | -26.5 | 102.125 | 1000.875 |
| 10 | 0.1875 | -0.0875 | -0.0125 | -27.625 | 101.5 | 998.75 |
| 11 | 0.15 | -0.0875 | -0.0125 | -30.75 | 102.25 | 995.625 |
| 12 | 0.0625 | -0.1125 | 0.025 | -31.25 | 104 | 995.875 |
| 13 | 0.075 | -0.05 | -0.0125 | -27.845 | 100.625 | 996.125 |
| 14 | 0.0625 | -0.025 | -0.0875 | -25.375 | 99.375 | 997.75 |
| 15 | -0.0625 | -0.0875 | -0.1 | -29.5 | 100.125 | 997.75 |
| 16 | 0.05 | -0.05 | -0.1 | -30.875 | 101.625 | 994.75 |
| 17 | 0.0875 | 0.05 | 0.0625 | -31.625 | 103.5 | 991 |
| 18 | 0.0125 | 0 | -0.0625 | -29.25 | 102.875 | 993.75 |
| 19 | 0.175 | -0.025 | 0.1 | -27.25 | 103.5 | 996.75 |
| 20 | 0.1125 | 0.0125 | -0.05 | -32 | 105.25 | 996.75 |
| 21 | 0.05 | -0.05 | -0.1625 | -29.875 | 101.125 | 999.25 |
| 22 | 0.05 | 0.0375 | -0.125 | -30.75 | 102.125 | 999.125 |
| 23 | 0 | -0.025 | -0.0625 | -34.25 | 101.375 | 998.125 |
| 24 | 0.025 | -0.1625 | -0.0875 | -34.25 | 103.625 | 994 |
| 25 | 0.0125 | -0.0375 | 0.0375 | -26.875 | 106.5 | 993 |
| ... | | | | | | |

[Fig. 12]
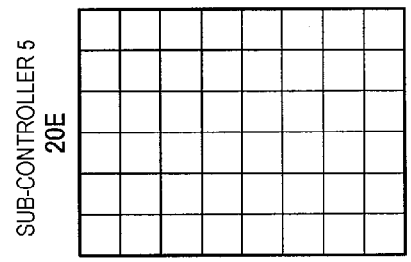
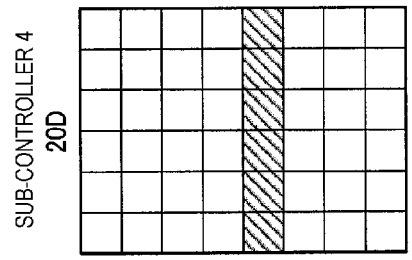
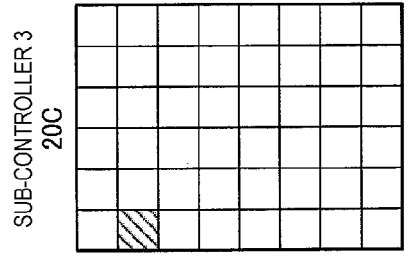
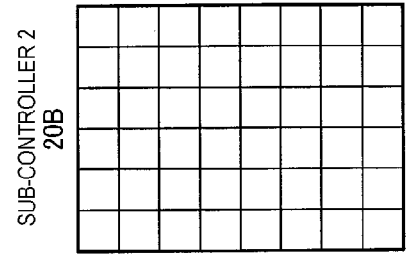
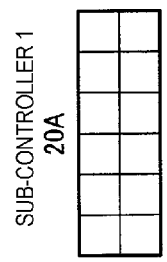

SYNCHRONOUS MEASUREMENT SYSTEM

CROSS-REFERENCE TO RELATED APPLICATIONS

This application is a U.S. National Phase Application under 35 U.S.C. 371 of International Application No. PCT/JP2014/001272, filed on Mar. 7, 2014. This application claims priority to Japanese Patent Application No. 2013-053257, filed Mar. 15, 2013. The entire disclosures of the above applications are expressly incorporated by reference herein.

TECHNICAL FIELD

The present invention relates to a synchronous measurement system and the like.

BACKGROUND ART

A plurality of sensor units are sometimes mounted on an object to be detected to measure various kinds of information such as the movement, the posture, and the distortion of the object to be detected. In this case, data collected from the respective plurality of sensor units need to be synchronized with one another.

In JP-A-2004-80132, for example, for synchronous detection of communication, a master communication circuit and a plurality of slave communication circuits are prepared. When the master communication circuit communicates with one of the plurality of slave communication circuits, the master communication circuit updates count data for the start of synchronization and synchronous detection in such a manner as 0, 1, 2, . . . and transmits the count data in addition to communication data. Each of the plurality of slave communication circuits can obtain synchronization timing of communication by receiving the count data.

In Japanese Patent No. 4926752, a sensor terminal, which receives a measurement start command from a server, incorporates a clock section. The sensor terminal side obtains time of measurement start from the clock section and records the time in measurement data.

TECHNICAL PROBLEM

In JP-A-2004-80132, communication between the master communication circuit and the slave communication circuit is synchronized. The plurality of sensor units are not simultaneously synchronized. In JP-A-2004-80132, in order to synchronize communication, when the master communication circuit communicates with one of the plurality of slave communication circuits, the master communication circuit needs to transmit the count data for the start of synchronization and synchronous detection in addition to the communication data. Therefore, since an amount of information to be transmitted is large, JP-A-2004-80132 cannot be applied to synchronous measurement.

The synchronous detection system of JP-A-2004-80132 can be referred to as centralized type. This is because synchronization of communication is solely managed by the master communication circuit in a centralized manner according to the transmission of the count data from the master communication circuit. In the centralized type, the master communication circuit is always involved in synchronous detection. Therefore, time occupied by the synchronous detection is long in the master communication circuit and time for displaying an original function of the master communication circuit is reduced.

In Japanese Patent No. 4926752, the sensor terminal needs to record measurement time. Therefore, Japanese Patent No. 4926752 is unsuitable for, in particular, synchronous measurement in which a sampling frequency is high. When clock sections are respectively mounted on a large number of installed sensor terminals, costs increase.

SUMMARY OF THE INVENTION

An object of some aspects of the invention is to provide a synchronous measurement system that can manage, on a controller side, synchronization timing of measurement data transmitted from a sensor unit to the controller on the basis of an instruction for a synchronization start output from the controller.

(1) An aspect of the invention relates to a synchronous measurement system including: a controller; and a sensor unit connected to the controller. The controller transmits a synchronization command to the sensor unit. The sensor unit transmits measurement data to the controller according to the synchronization command. The controller includes: a data processing section configured to process the measurement data transmitted from the sensor unit; and a counter configured to count the synchronization command. The controller builds a data structure to which the measurement data and a count value of the synchronization command corresponding to the measurement data are added.

In the aspect of the invention, the controller builds the data structure in which the count value of the synchronization command is added to the measurement data output from the sensor unit for each of synchronization commands. Therefore, the controller side can manage synchronization timing of the measurement data. Consequently, a lack and redundancy of data are easily known from count values of the synchronization commands. Therefore, as a precondition in synchronizing measurement data output from one sensor unit and measurement data output from another sensor unit, it is guaranteed that the same count value is added to the measurement data to be synchronized output from the sensor units.

(2) The aspect of the invention may be configured such that an ID for specifying the sensor unit is added to the data structure.

Then, measurement data from a plurality of sensor units input to one controller are distinguished by IDs. Moreover, a plurality of measurement data having the same count value are synchronized with one another.

(3) The aspect of the invention may be configured such that a plurality of the controllers are provided, and the controller transmit the synchronization commands to the sensor unit. In this case, as in the case explained above, a plurality of measurement data having the same count value are synchronized with one another.

(4) The aspect of the invention may be configured such that, when the count value is missing, the controller adds a data structure corresponding to the missing count value. Then, even if measurement data is missing because of some reason, it is possible to build a data structure to correspond to all count values. Therefore, by rearranging data in the order of the count values of the synchronization commands, data synchronized among the sensor units are easily compared.

(5) The aspect of the invention may be configured such that the added data structure is error data. According to the error data, it is possible to immediately recognize that measurement data is not obtained at timing corresponding to the count value of the error data. The significance of supplementing the missing data with the error data in this way resides in preventing a synchronization shift due to a missing count value rather than securing continuity of the data itself.

(6) The aspect of the invention may be configured such that the added data structure is interpolated on the basis of data corresponding to count values before and after the missing count value. The significance of supplementing the missing data with the interpolation data in this way resides in preventing a synchronization shift due to the missing count value and securing continuity of the data itself.

(7) The aspect of the invention may be configured such that, when a plurality of data structures having the same count value are present, one data structure of the plurality of data structures is left and the other data structure is deleted. Consequently, it is possible to prevent a synchronization shift due to redundancy of data.

(8) The aspect of the invention may be configured such that the controller includes a main controller and a sub-controller connected to the main controller, the sensor unit being connected to the sub-controller, and in the sub-controller, the data processing section and the counter are provided. In this way, the controller to which the sensor unit is connected can be provided as the sub-controller. A high-order main controller that manages the sub-controller can be provided.

(9) The aspect of the invention may be configured such that the controller includes a main controller and a sub-controller connected to the main controller, the sensor unit being connected to the sub-controller, the data processing section includes a first data processing section provided in the main controller and a second data processing section provided in the sub-controller, one of the first data processing section and the second data processing section performs processing of a data structure having an abnormal count value, and the other performs processing for adding the count value of the counter to the measurement data.

In this way, roles of the data processing for the data structure can be shared by the main controller and the sub-controller. In particular, processing for a data structure having a missing count value or the same count value can be performed off-line. Therefore, the main controller can perform off-line processing in an idle time.

(10) The aspect of the invention may be configured such that the sub-controller includes a sub-controller master and a sub-controller slave connected to the sub-controller master, the main controller transmits a start command to the sub-controller master, the sub-controller master generates a trigger signal according to reception of the start command and transmits the trigger signal to the sub-controller slave, and the sub-controller master and the sub-controller slave transmit the synchronization command to the sensor unit on the basis of the trigger signal.

The sub-controller master, which receives the start command from the main controller, generates the trigger signal and transmits the trigger signal to the sub-controller slave. Each of a plurality of the sub-controllers (the sub-controller master and the sub-controller slave) transmits the synchronization command to a plurality of the sensor units on the basis of the trigger signal. Consequently, it is possible to simultaneously synchronize all the sensor units connected to all the sub-controller. Moreover, the main controller is not involved in synchronous detection after transmitting the start command. Each of the plurality of sub-controllers can perform the synchronous detection in a distributed manner.

(11) The aspect of the invention may be configured such that the sensor unit includes at least one of an acceleration sensor and an angular velocity sensor. Consequently, it is possible to measure various kinds of information such as the movements, the postures, and the distortions in a plurality of places of an object to be detected (a human body, a moving object, an immobile property, etc.) in synchronization.

BRIEF DESCRIPTION OF THE DRAWINGS

FIG. 1 is a block diagram showing a synchronous measurement system according to an embodiment of the invention.

FIG. 2 is a block diagram showing a main controller shown in FIG. 1.

FIG. 3 is a block diagram showing a configuration common to a plurality of sub-controllers shown in FIG. 1.

FIG. 4 is a block diagram of a sensor unit shown in FIG. 1.

FIG. 5 is a timing chart showing a synchronous measurement operation.

FIG. 6A is a diagram showing data structures stored in memories of the sensor unit.

FIG. 6B is a diagram showing data structures stored in memories of the sub-controller.

FIG. 6C is a diagram showing data structures stored in memories of the main controller.

FIG. 7 is a data structure having a skipped number in count values.

FIG. 8 is a diagram showing a data sequence in which the skipped number is eliminated by addition of error data.

FIG. 9 is a diagram showing a data sequence in which the skipped number is eliminated by interpolation based on data before and after the skipped number.

FIG. 10 is a diagram showing a data sequence in which there is redundancy in count values.

FIG. 11 is a diagram showing a data sequence in which the redundancy of the count values is eliminated by deletion.

FIG. 12 is a diagram showing an error indication example in an operation check mode.

DESCRIPTION OF THE PREFERRED EMBODIMENTS

A preferred embodiment of the invention is explained in detail below. Note that the embodiment explained below does not unduly limit contents of the invention described in the appended claims. All of components explained in the embodiment are not always essential as means for solution of the invention.

1. Synchronous measurement system FIG. 1 shows a synchronous measurement system 1 according to this embodiment. In FIG. 1, the synchronous measurement system 1 includes, as at least one controller, a main controller 10 and a plurality of sub-controllers 20A to 20E LAN-connected to the main controller 10. A plurality of sensor units 30 are connected to each of the plurality of sub-controllers 20A to 20E.

The main controller 10 is, for example, a personal computer and includes a main body 11, a display section 12, a keyboard 13, and an Ethernet hub 14. The main controller 10 is installed with a synchronous measurement system execution program and controls synchronous measurement in the five sub-controllers 20A to 20E.

The plurality of sub-controllers 20A to 20E are connected to the Ethernet hub 14 of the main controller 10 by Ethernet cables 15. One of the plurality of sub-controllers 20A to 20E is a sub-controller master 20A.

The other four sub-controllers are sub-controller slaves 20B to 20E connected to the sub-controller master 20A.

In this embodiment, the plurality of sub-controllers 20A to 20E are daisy chain-connected by, for example, optical communication cables 21. That is, the sub-controller slave 20B is connected to the sub-controller master 20A, the sub-controller slave 20C is connected to the sub-controller slave 20B, and the other sub-controller slaves are connected in series. Then, even if the number of sub-controller slaves increases, the sub-controller master and the plurality of sub-controller slaves only have to be connected in series. Cable laying and the like are easy compared with star type connection.

Each of the plurality of sub-controllers 20A to 20E includes a plurality of bus ports, for example, CAN (Controller Area Network) bus ports 22. Note that the CAN is a highly reliable communication form robust against an error and noise and is suitable for this embodiment in that a broadcasting command can be used. However, the bus ports may adopt other bus specifications and are not limited to the CAN. Maximum six sensor units are connected to the CAN bus cable 23 connected to each of the CAN bus ports 22. Since eight CAN bus ports 22 are provided in each of the plurality of sub-controllers 20A to 20E, maximum forty-eight sensor units can be connected to each of the plurality of sub-controllers 20A to 20E. In this embodiment, twelve sensor units 30 are connected to the sub-controller master 20A and forty-eight sensor units 30 are connected to each of the sub-controller slaves 20B to 20E. The entire system 1 includes two hundred and four sensor units 30.

FIG. 2 is a block diagram showing the main controller 10. In FIG. 2, besides the display section 12 and the keyboard 13, a command generating section 102, a command decoder 103, a data processing section 104, a memory 105, a clocking section 106, a communication section 107, and the like are connected to a bus line of a CPU 101 provided in the main body 11 shown in FIG. 1. The Ethernet hub 14 shown in FIG. 1 is connected to the communication section 107. For example, when data from the sensor units 30 are collected, the command generating section 102 generates a data collection start command (hereinafter, start command). In an operation check mode before data measurement, the command generating section 102 generates, for example, a reset command as a check command. The command decoder 103 decodes end commands and the like transmitted from the sub-controllers 20A to 20E. The data processing section 104 is explained below.

FIG. 3 is a block diagram showing a configuration common to the plurality of sub-controllers 20A to 20E. A command generating section 202, a command decoder 203, a data processing section 204, a memory 205, a trigger transmitting section 206, a trigger receiving section 207, a counter 208, a first communication section 209, and a second communication section 210 are connected to a bus line of a CPU 201 provided in each of the sub-controllers 20A to 20E. The Ethernet cables 15 shown in FIG. 1 are connected to ports of the first communication section 209. The CAN ports 22 shown in FIG. 1 are connected to the second communication section 210.

A light emitting section 211 is connected to the trigger transmitting section 206. A light receiving section 212 is connected to the trigger receiving section 207. The optical communication cable 21 is connected to the light emitting section 211 or the light receiving section 212, whereby a trigger signal, which is an optical signal, can be emitted or received. In the sub-controller master 20A, the optical communication cable 21 is connected to only the light emitting section 211. In the sub-controller slave 20E, the optical communication cable 21 is connected to only the light receiving section 212. Each of the sub-controllers 20A to 20E includes an optical switch 213 configured to divide the trigger signal received by the light receiving section 212 and input the trigger signal to the light emitting section 211. In each of the sub-controller slaves 20B to 20D, the optical switch 213 is turned on and the optical communication cable 21 is connected to both of the light emitting section 211 and the light receiving section 212. Consequently, each of the sub-controller slaves 20B to 20D can transfer the trigger signal from an upstream side to a downstream side. When the trigger signal is transferred, after the optical signal (the trigger signal) from the upstream side is received by the light receiving section 212 and converted into an electric signal, light is emitted again by the light emitting section 211. Therefore, the optical signal is waveform-shaped. When the trigger signal is transmitted as a digital electric signal, the trigger signal can be waveform-shaped by providing a buffer in the sub-controller slave. Consequently, synchronization accuracy is improved. As in the sub-controller slaves 20B to 20D, in the sub-controller master 20A, the switch 213 is turned on and the trigger signal output from the trigger transmitting section 206 is input to the trigger receiving section 207.

FIG. 4 shows a block diagram of the sensor unit 30. The sensor unit 30 is attached to an analysis target object and performs processing for detecting a given physical quantity. In this embodiment, as shown in FIG. 4, a sensor includes at least one, for example, a plurality of sensors $301x$ to $301z$ and $302x$ to $302z$.

The sensor in this embodiment is a sensor configured to detect the given physical quantity and output a signal (data) corresponding to the magnitude of the detected physical quantity (e.g., acceleration, angular velocity, velocity, or angular acceleration). In this embodiment, the sensor includes a six-axis motion sensor including three-axis acceleration sensors $301x$ to $301z$ (an example of inertial sensors) configured to detect accelerations in X-axis, Y-axis, and Z-axis directions and three-axis gyro sensors (an example of angular velocity sensors and inertial sensors) $302x$ to $302z$ configured to detect angular velocities in the X-axis, Y-axis, and Z-axis directions.

The sensor unit 30 can include, on a bus line of a CPU 303, a command generating section 304, a command decoder 305, a data processing section 306, and a communication section 307. The command decoder 305 decodes a synchronization command and a check command such as a reset command. The data processing section 306 processes measurement data of the sensors $301x$ to $301z$ and $302x$ to $302z$ into a data structure associated with an ID of the sensor unit 30 and outputs the data structure from the communication section 307. In this embodiment, 1 to 6 are allocated to IDs of the sensor units 30 connected to odd number-th CAN ports 22. 7 to 12 are allocated to IDs of the sensor units 30 connected to even number-th CAN ports 22. However, the IDs are not limited to this. For example, different IDs may be given to all of the forty-eight sensor units 30. The data processing section 306 may perform processing for bias correction and temperature correction of the sensors $301x$ to $301z$ and $302x$ to $302z$. Note that functions for the bias correction and the temperature correction may be incorporated in the sensor itself.

2. Synchronous measurement operation The operation in the synchronous measurement system 1 configured as explained above is explained. Measurement is started by operating the keyboard 13 of the main controller 10 shown in FIG. 1. The main controller 10 generates a start command in the command generating section 102. In the start command, the number of times of measurement N can be designated. The start command is transmitted to all the sub-controllers 20A to 20E via the communication section 107, the Ethernet hub 14, and the Ethernet cables (FIG. 1) shown in FIG. 2. Accuracy of synchronization is not required in transmission of the start command from the main controller 10 to the plurality of sub-controllers 20A to 20E.

Each of the sub-controllers 20A to 20E receives the start command in the first communication section 209 shown in FIG. 3 and decodes the start command in the command decoder 203. As shown in FIG. 5, the sub-controller master 20A generates, for example, a trigger signal, which is a digital signal, in the trigger transmitting section 206 according to the reception of the start command and outputs the trigger signal as an optical signal in the light-emitting section 211.

Since the switch 213 shown in FIG. 3 is on, the trigger signal transmitted by the trigger transmitting section 206 is input to the trigger receiving section 207 via the switch 213. The sub-controller master 20A receives, a trigger signal A (see FIG. 5).

On the other hand, each of the sub-controller slaves 20B to 20E receives the start command from the main controller 10 via the first communication section 209 and decodes the start command in the command decoder 203. Consequently, each of the sub-controller slaves 20B to 20E can be set in a standby state for staying on standby for reception of a trigger signal.

Thereafter, each of the sub-controller slaves 20B to 20E receives, in the light receiving section 212, the trigger signal from the sub-controller master 20A directly or via the sub-controller slaves on the upstream side and receives a trigger signal B to a trigger signal E in the trigger receiving section 207 (see FIG. 5). In this embodiment, a digital signal is transmitted by optical communication as the trigger signal. As shown in FIG. 5, synchronization timing can be taken by an edge of the trigger signal. Therefore, time deviation T1 from the issuance of the start command to the reception of the trigger signal A to the trigger signal E shown in FIG. 5 is in the order of several nS and can be neglected.

When the trigger signal is received in the trigger receiving section 207, each of the sub-controllers 20A to 20E generates a synchronization command in the command generating section 202 shown in FIG. 3 on the basis of the edge of the trigger signal. Each of the sub-controllers 20A to 20E transmits the synchronization command to the plurality of sensor units 30 from the second communication section 210 via the CAN ports 22 by broadcasting.

Each of the plurality of sensor units 30 connected to each of the sub-controllers 20A to 20E decodes, in the command decoder 305, synchronization commands A to E transmitted from the sub-controllers 20A to 20E (see FIG. 5). Time deviation T2 of the synchronization commands A to E shown in FIG. 5 is naturally larger than the time deviation T1 of the trigger signal A to the trigger signal E but is in the order of several microseconds and can be neglected.

The sensors 301x to 301z and 302x to 302z of the sensor unit 30 measure measurement data. The data processing section 306 outputs only data synchronizing with the synchronization command from the communication section 307 as a data structure of a predetermined format. However, the sensor unit 30 may start measurement and output the measurement data in synchronization with the synchronization command. In this embodiment, first data after the input of the synchronization command is output. The sub-controller 20A outputs first data after the input of the synchronization command A as data 1. Similarly, for example, the sub-controller 20E outputs first data after the input of the synchronization command E as the data 1. Note that, in this embodiment, each of the sensor units 30 is performing high-speed sampling. A sampling frequency of the sensor unit 30 is, for example, 1 KHz. In this case, if T2 is equal to or smaller than 1 mS, a synchronization shift does not occur. In this embodiment, since T2 is in the order of microseconds, synchronous measurement is possible.

As explained above, the start command can include information the number of times of measurement N. When N is 2 or more, the sub-controller 20A repeatedly generates N trigger signals at every designated measurement interval (see FIG. 5). The sensor unit 30 outputs the measurement data 1 to N to the sub-controller 20A on the basis of each of the N trigger signals.

FIG. 6A shows a data structure 320 built by the data processing section 306 of the sensor unit 30. The data structure 320 is configured by an ID of the sensor unit and six-axis data. The data processing section 306 adds the ID of the sensor unit 30 to data output from the sensors 301x to 301z and 302x to 302z.

FIG. 6B shows a data structure 220 built by the data processing section 204 of each of the sub-controllers 20A and 20B and stored in the memory 205. In the data structure 220, as shown in FIG. 6B, a number of the CAN port 22 and a count value of the synchronization command in the counter 208 are added to the data structure 320 output from the sensor unit 30 shown in FIG. 6A. Since the data is input to each of the sub-controllers 20A and 20B via the CAN port 22, according to the number of the CAN port 22 and an ID of the sensor unit 30 for each of the CAN ports 22, the sub-controller specifies which of the maximum forty-eight sensor units 30 the sensor unit is. The counter 208 shown in FIG. 3 is counted up every time the number of times N is set by the start command and, for example, the synchronization command is issued. By recording a count value of the counter 208, it is specified which of the synchronization commands shown in FIG. 5 the data follows.

When data corresponding to the Nth synchronization command is input to each of the sub-controllers 20A to 20E, the sub-controller issues, for example, an end command by the command decoder 203 and inputs the end command to the main controller 10. When the main controller 10 issues, for example, a data collection command, each of the sub-controllers 20A to 20E outputs the data stored in the memory 205 to the main controller 10.

FIG. 6C shows a data structure 120 built by the data processing section 104 of the main controller 10 and stored in the memory 105. In the data structure 120, as shown in FIG. 6C, a sub-controller ID is added to the data structure 220 output from each of the sub-controllers 20A to 20E shown in FIG. 6B. According to the data structure 120 shown in FIG. 6C, it is specified when the data is output from which of the two hundred and four sensor units 30 in total. The sensor ID, the CAN port number, and the sub-controller ID shown in FIG. 6A to FIG. 6C are IDs for specifying the two hundred and four sensor units 30 in total and are not limited to hierarchically given IDs. For example, different sensor IDs may be given to the two hundred and four sensor units in total. Then, the CAN port number and the sub-controller ID are unnecessary.

In order to adjust the data structure shown in FIG. 6C to resolution during an output, the data processing section 104 of the main controller 10 can multiply a numerical value of the six-axis data shown in FIG. 6C with a coefficient or calculate time corresponding to the count value in the counter 208 shown in FIG. 3 from the clocking section 106 shown in FIG. 2 and add the time to the data structure shown in FIG. 6C.

3. Data processing for eliminating a skipped number or redundancy of a count value FIGS. 7 to 11 show data sequences for explaining processing carried out by the data processing section (also referred to as first data processing section) 104 of the main controller 10 or the data processing section (also referred to as second data processing section) 204 arranged in each of the plurality of sub-controllers 20A to 20E. The data sequences shown in FIGS. 7 to 11 are six-axis data measured by certain one sensor unit 30. Sampling count values of the counter 208 shown in FIG. 3 are added to the six-axis data. The data sequences shown in FIGS. 7 to 11 are sorted by the sampling count values and arrayed.

A skipped number (a missing count value) is present in the data sequence shown in FIG. 7. Data corresponding to a sampling count value "10" is missing. That is, for example, although the command generating section 202 of the sub-controller 20A issues a tenth synchronization command and transmits the synchronization command to the sensor unit 30, measurement data corresponding to the synchronization command is not transmitted from the sensor unit 30 to the sub-controller 20A.

When the sampling count value in the data sequence is the skipped number as shown in FIG. 7, the data processing section 104 or the data processing section 204 can add a data structure corresponding to the skipped number as shown in FIG. 8 or 9. Then, even if measurement data is missing because of some reason, it is possible to build a data structure to correspond to all count values. Therefore, by rearranging data in the order of the count values of the synchronization commands, data synchronized among the sensor units 30 are easily compared.

As shown in FIG. 8, data added as a count value "10" can be error data. The error data means data in a range in which the data is effective as measurement data. According to the addition of the error data, it is possible to immediately recognize that measurement data is not obtained at timing corresponding to the count value. The significance of supplementing the missing data with the error data in this way resides in preventing a synchronization shift due to a skipped number rather than securing continuity of the data itself.

Alternatively, as shown in FIG. 9, the data added as the count value "10" can be interpolated, for example, linearly interpolated on the basis of data corresponding to count values "9" and "11" before and after the skipped number. The significance of supplementing the missing data with the interpolation data in this way resides in preventing a synchronization shift due to the skipped number and securing continuity of the data itself.

FIG. 10 shows an example in which a plurality of data having the same count value "10" are present. That is, for example, after the command generating section 202 of the sub-controller 20A issues a tenth synchronization command and transmits the synchronization command to the sensor unit 30 and before the command generating section 202 issues an eleventh synchronization command, measurement data is transmitted from the sensor unit 30 to the sub-controller 20A twice.

When data corresponding to a sampling count value "10" in a data sequence is redundantly present as shown in FIG. 10, the data processing section 104 or the data processing section 204 can leave one of two data corresponding to the sampling count value "10" and delete the other data. Consequently, it is possible to prevent a synchronization shift due to the redundancy of the data.

The data processing shown in FIG. 8, 9, or 11 may be carried out in the data processing section (the second data processing section) 204 provided in each of the sub-controllers 20A to 20E or may be carried out in the data processing section (the first data processing section) 104 of the main controller 10. In particular, processing for a data structure having a missing count value (a skipped number) or the same count value can be performed off-line. Therefore, the main controller 10 can perform off-line processing in an idle time. Consequently, it is possible to reduce a load on the sub-controllers 20A to 20E.

4. Error processing in the operation check mode or the like The synchronous measurement system 1 in this embodiment can carry out the operation check mode before data measurement. The main controller 10 transmits an operation check command to the sub-controllers 20A to 20E. Each of the sub-controllers 20A to 20E transmits, for example, a reset command to all the sensor units 30. The sensor unit 30 transmits an ID in response to the reset command from each of the sub-controllers 20A to 20E.

Consequently, error information of the sensor unit 30 not responding to the reset command can be displayed on the display section 12 by the main controller 10.

FIG. 12 shows an example of an error indication of the sensor unit 30. In FIG. 12, to correspond to each of the five sub-controllers 20A to 20E, display regions are provided by the number of the sensor units 30 connected to the sub-controller. A white indication indicates a normal sensor unit 30 and a black indication indicates the sensor unit 30 in which an error occurs. In the example shown in FIG. 12, an error is indicated in the sensor unit 30 of ID1 connected to the second CAN port 22 of the sub-controller 20C. The error is considered to be caused by a connection failure of the sensor unit 30 alone. Further, in FIG. 12, an error is indicated in the sensor units 30 of ID1 to ID6 connected to the fifth CAN port 22 of the sub-controller 20D. The error is considered to be caused by a connection failure of the CAN bus cable 23 to the fifth CAN port 22.

As explained above, a connection state of the main controller 10, the plurality of sub-controllers 20A to 20E, and the plurality of sensor units 30, which is a precondition in performing synchronous measurement, can be checked and displayed on the display section 12 by the main controller 10. Therefore, an operator can shift to data measurement after correcting a connection failure.

In this embodiment, when an error occurs during measurement, processing is continued as much as possible and measurement data is stored in the main controller 10. For example, when the number of times of a data reception failure in which, for example, each of the sub-controllers 20A to 20E cannot receive data from the sensor unit 30 is equal to or larger than a fixed number, the sub-controller notifies the main controller 10 of an error only once and continues the processing. When each of the sub-controllers 20A to 20E detects that data cannot be received from a certain sensor unit 30, concerning the sensor unit 30, the sub-controller notifies the main controller 10 of an error only in the first detection and continues the processing.

When each of the sub-controllers 20A to 20E detects that data cannot be received from a certain CAN port 22, concerning the CAN port 22, the sub-controller notifies the main controller 10 of an error only in the first detection and continues the processing. When any one of the sub-controllers 20A to 20E cannot receive a trigger signal for a fixed time, the sub-controller notifies the main controller 10 of an error only once. When the main controller 10 receives the error notification, the main controller 10 can forcibly stop the measurement processing of the sub-controller in which the error occurs.

When an error occurs in reading measurement data from any one of the sub-controllers 20A to 20E after the end of the measurement, the main controller 10 notifies the operator of an error together with a sub-controller name and reads data from the sub-controller from which the data can be normally read. The main controller 10 stores measurement data in the nonvolatile memory 205 in each of the sub-controllers 20A to 20E until the start of the next measurement.

The embodiment is explained in detail above. However, those skilled in the art could easily understand that various modifications are possible without substantively departing from the new matters and the effects of the invention. Therefore, all such modifications are regarded as being included in the scope of the invention. For example, the terms described at least once together with broader or synonymous different terms in the specification or the drawings can be replaced with the different terms. The configurations and the operations of the main controller, the sub-controller, the sub-controller master, the sub-controller slave, the sensor unit, and the like are not limited to those explained in the embodiment. Various modifications of the configurations and the operations are possible. For example, the wired connection in the embodiment can be replaced with wireless connection.

The invention claimed is:

1. A synchronous measurement system comprising:
a controller; and
a sensor unit connected to the controller, wherein
the controller transmits a synchronization command to the sensor unit,
the sensor unit transmits measurement data to the controller according to the synchronization command,
the controller includes:
   a data processing section configured to process the measurement data transmitted from the sensor unit; and
   a counter configured to count the synchronization command,
the controller builds a data structure to which the measurement data and a count value of the synchronization command corresponding to the measurement data are added, and
when a plurality of data structures having a same count value are present, one data structure of the plurality of data structures is left and the other data structure is deleted by the controller.

2. The synchronous measurement system according to claim 1, wherein an ID for specifying the sensor unit is added to the data structure.

3. The synchronous measurement system according to claim 1, wherein a plurality of the controllers are provided and the controller transmit the synchronization commands to the sensor unit.

4. The synchronous measurement system according to claim 1, wherein, when the count value is missing, the controller adds a data structure corresponding to the missing count value.

5. The synchronous measurement system according to claim 4, wherein the added data structure is error data.

6. The synchronous measurement system according to claim 4, wherein the added data structure is interpolated on the basis of data corresponding to count values before and after the missing count value.

7. The synchronous measurement system according to claim 1, wherein
the controller includes a main controller and a sub-controller connected to the main controller, the sensor unit being connected to the sub-controller, and
in the sub-controller, the data processing section and the counter are provided.

8. The synchronous measurement system according to claim 1, wherein
the controller includes a main controller and a sub-controller connected to the main controller, the sensor unit being connected to the sub-controller,
the data processing section includes a first data processing section provided in the main controller and a second data processing section provided in the sub-controller and
one of the first data processing section and the second data processing section performs processing of a data structure having an abnormal count value and the other performs processing for adding the count value of the counter to the measurement data.

9. The synchronous measurement system according to claim 7, wherein the sub-controller includes a sub-controller master and a sub-controller slave connected to the sub-controller master,
the main controller transmits a start command to the sub-controller master,
the sub-controller master generates a trigger signal according to reception of the start command and transmits the trigger signal to the sub-controller slave, and
the sub-controller master and the sub-controller slave transmit the synchronization command to the sensor unit on the basis of the trigger signal.

10. The synchronous measurement system according to claim 1, wherein the sensor unit includes at least one of an acceleration sensor and an angular velocity sensor.

11. The synchronous measurement system according to claim 8, wherein the sub-controller includes a sub-controller master and a sub-controller slave connected to the sub-controller master,
the main controller transmits a start command to the sub-controller master,
the sub-controller master generates a trigger signal according to reception of the start command and transmits the trigger signal to the sub-controller slave, and
the sub-controller master and the sub-controller slave transmit the synchronization command to the sensor unit on the basis of the trigger signal.

* * * * *